United States Patent [19]

Schultz

[11] Patent Number: 4,711,655

[45] Date of Patent: Dec. 8, 1987

[54] ADJUSTABLE QUENCH FOR TEMPERING A GLASS SHEET

[75] Inventor: Stephen J. Schultz, Pittsburgh, Pa.

[73] Assignee: PPG Industries, Inc., Pittsburgh, Pa.

[21] Appl. No.: 871,937

[22] Filed: Jun. 9, 1986

[51] Int. Cl.$^4$ ............................................. C03B 27/04
[52] U.S. Cl. ........................................ 65/351; 65/114; 65/348; 65/349
[58] Field of Search ................. 65/104, 114, 348, 351, 65/350

[56] References Cited

U.S. PATENT DOCUMENTS

| | | | |
|---|---|---|---|
| 3,231,353 | 1/1966 | Julio | 65/114 |
| 3,393,062 | 7/1968 | Hesten et al. | 65/115 |
| 4,071,346 | 1/1978 | Schmidt | 65/351 |
| 4,140,511 | 2/1979 | Imler | 65/114 |
| 4,314,836 | 2/1982 | Seymour | 65/114 |
| 4,323,385 | 4/1982 | Gintert et al. | 65/351 |
| 4,343,645 | 8/1982 | Abe | 65/348 |
| 4,619,683 | 10/1986 | Halberschmidt et al. | 65/104 X |

FOREIGN PATENT DOCUMENTS

0123120A2 3/1984 European Pat. Off. .
801532 9/1958 United Kingdom ................. 65/348

OTHER PUBLICATIONS

Karl-Heinz Dicks, "New Bending and Tempering Facility for Automotive Safety Glazing", Jun. 1983, *Glass International.*
Karl-Heinz Dicks, "Bending and Tempering of Automotive and Similar Safety Glazings", Oct. 1983, *Glass.*

*Primary Examiner*—Arthur Kellogg
*Attorney, Agent, or Firm*—Andrew C. Siminerio

[57] ABSTRACT

An adjustable quench for tempering hot glass sheets of varying transverse configurations, having overlapping members that seal a flexible nozzle assembly as it changes configurations. Nozzles extend from the flexible nozzle assembly towards the shaped glass sheet to be cooled such that the quenching surface formed by the head portions of the nozzles generally parallel the major surfaces of the shaped glass sheet. Each individual flexible nozzle assembly is connected to a common drive that can simultaneously flex all the nozzle assemblies.

26 Claims, 8 Drawing Figures

ADJUSTABLE QUENCH FOR TEMPERING A GLASS SHEET

FIELD OF INVENTION

This invention relates to the tempering of hot shaped glass sheets and in a particular to an adjustable quench for tempering hot glass sheets of varying transverse configurations.

TECHNICAL CONSIDERATIONS

In the manufacture of tempered shaped glass sheets, the glass sheets are normally heated to their heat softened temperature, shaped by one of a variety of well known forming operations and cooled to impart at least a partial temper in the glass sheet. In the quenching operation, large quantities of cooling fluid, such as air, are directed at the major surfaces of the hot shaped glass sheet to rapidly lower its temperature below its strain point and establish a stress gradient through the glass sheet thickness. The outer major surfaces of the glass sheet form a compression layer while the center of the glass sheet forms a tension layer.

Quench stations generally include upper and lower sets of opposing nozzles. The sets of nozzles are spaced at a predetermined distance apart to allow a shaped glass sheet to be positioned therebetween. To achieve uniform tempering, the transverse profile of the sets of nozzles is contoured to approximate the transverse profile of the shaped glass sheet positioned between the nozzles. As a result, different upper and lower nozzle sets are required each time a shaped glass sheet with a different curvature profile is quenched. This in turn results in delays due to set-up times as well as additional tooling and associated maintenance costs. To partially offset these additional costs, the nozzle profile in the quench station may be contoured to assume an average position that allows several differently curved glass sheets to be quenched with the same quench nozzle arrangement. Although such an arrangement reduces tooling and maintenance costs, the nozzles will be at varying distances from the major surface of the glass sheet and may result in nonuniform tempering.

It would be advantageous to have a quenching arrangement wherein the nozzle profile could be easily adjusted to correspond to the shape of different curved glass sheet configurations.

PATENTS OF INTEREST

U.S. Pat. No. 3,393,062 to Hesten et al. teaches a glass sheet tempering arrangement designed to differentially temper a glass sheet. Annular passages surround selected nozzles in the quenching apparatus and selectively provide either additional gaseous chilling medium of a different pressure at which the chilling medium is delivered through the nozzle or at an exhaust pressure for withdrawing gas from the nozzle. The head portions of the nozzles are positioned along a fixed transverse radius approximating the curve profile of the glass sheet being quenched.

U.S. Pat. No. 4,071,346 to Schmidt teaches an improved support for holding the nozzles of an air tempering apparatus in individually adjusted axial position. Each nozzle is slidably engaged by an expandable member positioned between a pair of apertured metal plates. The expandable member is thereafter expanded into pressure holding engagement with each nozzle to hold them in their axial adjusted position. To change the curved configuration of the tempering apparatus, the position of each individual nozzle must be individually adjusted.

U.S. Pat. Nos. 4,314,836 to Seymour and 4,323,385 to Gintert et al. each teach a tempering apparatus with a nozzle arrangement conforming to the transverse configuration of the glass sheet being quenched. The nozzle arrangement in Gintert is used for tempering in a vertical pressed bending arrangement and is not adjustable. The connecting pipes for the nozzles in Seymour are adjusted to form a curved surface approximating the shape of the glass sheet and are locked in place.

U.S. Pat. Nos. 3,231,353 to Julio; 4,140,511 to Imler; and 4,343,645 to Abe teach glass sheet tempering arrangements with flexible or adjustable nozzles. In Julio, each individual tempering nozzle is provided with a flexible tip that is individually adjustable both rotatively and vertically of the nozzle base and is free to bend with respect to the nozzle base. In Imler, the tempering apparatus for a vertically pressed glass sheet includes a plurality of nozzle boxes extending longitudinally along the length of the glass sheet. The boxes can be adjusted so as to enable the nozzle arrays to assume pairs of spaced configurations that match the longitudinal shape of the glass sheet undergoing quenching. The nozzle boxes are thereafter oscillated during quenching to enable the blast from the nozzles to sweep across the entire major surfaces of the glass sheet undergoing quenching. The quenching apparatus in Abe includes a curved nonadjustable center section with adjustable side portions on opposite sides of the central portion. Each side portion can be adjusted depending on the particular curvature of the curved glass sheet to be tempered.

European patent application No. 0 123 120 A2 to Dicks and Kramer teaches a flexible nozzle rib arrangement that can be deformed to provide different radii of curvature. Overlapping U-shaped covers are held to two round spring steel bars that support and flex the assembly. One end portion of each cover is folded to receive an adjacent cover. Additional walls are positioned around the outer periphery of nozzle rib to form a pocket to receive portions of the covers. To bend the assembly, each end of the steel bars is positioned between a pair of rollers which can be tilted to provide a bending movement in the bars.

SUMMARY OF THE INVENTION

An object of the invention is to provide a flexible and adjustable quenching apparatus for cooling hot glass sheets. A flexible nozzle support with a plurality of nozzles extends toward a major surface of the glass sheet to be cooled to form a quench surface. Overlapping cover plates may extend across the nozzle support and into the nozzle box to seal the flexible assembly. The opposing ends of each nozzle support may each be connected, through individual linkage arrangements, to common pivoting bars on each side of the apparatus. A drive arrangement may either individually or simultaneously rotate the pivot bars which in turn flex the ends of the nozzle support to adjust the configuration of the quench surface. The quench surface may be adjusted such that the ends of the nozzle are all equally spaced from the glass sheet so as to provide a uniform density of nozzles or the quench surface may be irregularly spaced from the glass sheet to concentrate the nozzles at selected regions at the glass sheet surface.

Another object of this invention is to provide a method of fabricating shaped glass sheets. Glass sheets are heated, shaped, and tempered and prior to shaping glass sheets of a different configuration, the nozzle assemblies of the quench station are adjusted to assume a new transverse configuration corresponding to the transverse configuration of the subsequently shaped glass sheets.

The present invention provides the capability to use a single quench apparatus for a variety of glass sheet configurations. The quench surface can be adjusted so as to provide the most effective quenching configuration for each glass sheet shape.

DETAILED DESCRIPTION OF THE INVENTION

Figure 1:
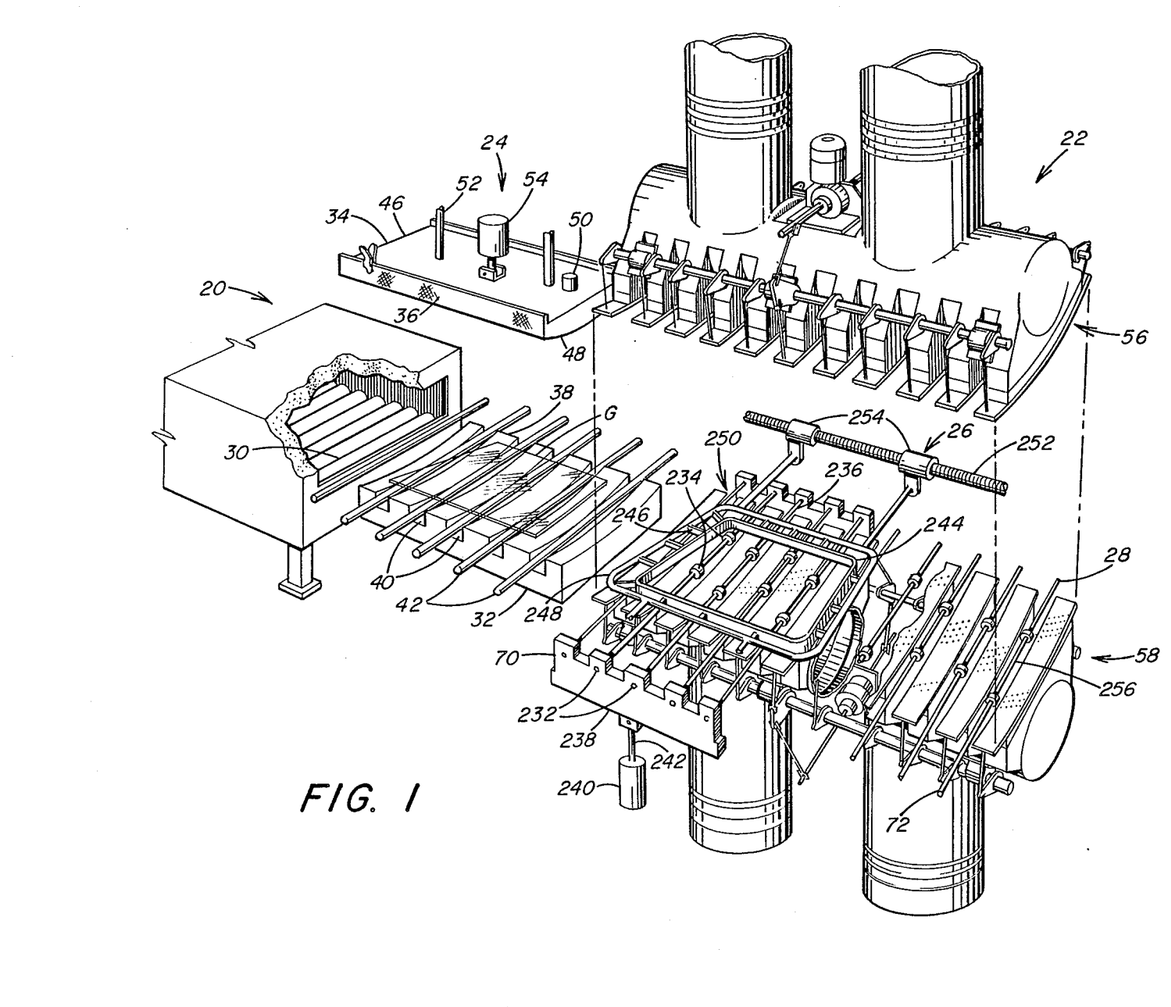
FIG. 1 is a side elevation of a heating, bending and tempering arrangement illustrating the quenching arrangement of the present invention.

In FIG. 1 there is shown a shaping and tempering line including a furnace 20 (only the exit end of which is shown), a shaping station 22 and a tempering station 24. The tempering station 24 according to the present invention provides means to adjust the transverse curvature of the quenching nozzles to correspond to the transverse curvature of a shaped glass sheet passing therethrough.

Any arrangement known in the art for heating and conveying a series of horizontally disposed glass sheets may be employed in connection with the quenching process of the present invention. Accordingly, glass sheets may be conveyed on rolls through a heating furnace for entry into a so called horizontal press bending station as in U.S. Pat. No. 4,197,108 to Frank, et al., or conveyed on a gas hearth through a heating furnace for entry into a bending station where they are shaped by a drop forming process as depicted in U.S. Pat. No. 4,204,853 to Seymour or conveyed on curved forming rolls to be shaped by a roll forming process as taught in U.S. Pat. No. 4,139,359 to Johnson, et al. or by any other suitable bending process before they are tempered by sudden and rapid cooling. While the specific embodiment of this invention will be described in conjunction with the quenching apparatus for cooling horizontally disposed glass sheets, it is understood that the present invention may also be employed to chill glass sheets that are supported vertically either by tongs as in U.S. Pat. No. 3,290,136 to Thomas or otherwise supported in an upright position as in U.S. Pat. No. 3,341,313 to Wheeler, et al. for heat treatment prior to the sudden cooling step.

Referring to FIG. 1 of the drawings, an apparatus for treating and shaping sheets of material such as glass, includes a heating means including a furnace 20 through which sheets of glass are conveyed from a loading station (not shown) while being heated to the glass deformation temperature. A tempering station 22 as taught in the present invention for cooling the curved sheets of glass and an unloading station (not shown) beyond the tempering station 22 are located in end-to-end relation to the right of the furnace 20. An intermediate or shaping station 24 is disposed between the furnace 20 and the tempering station 22 A sheet transfer means 26 located in the tempering station 22 transfers the shaped glass sheet to a downstream conveyor 28 for transport through the tempering station 22.

Heat may be supplied in the furnace 20, for example, by hot gases from gas burners or by electrical radiant heaters or by a combination of both, which heat supply means are well known in the art. The heating means includes a horizontal conveyor comprising longitudinally spaced, transversely extending conveyor rolls 30 that define a path of travel which extends through the furnace 20 and the shaping station 22. The rolls 30 of the conveyor are arranged in sections and their rotational speed controlled electronically so that the speed of the different conveyor sections may be controlled and synchronized in a manner well known in the art.

With continued reference to FIG. 1, the shaping station 24, is similar to that disclosed in U.S. Pat. No. 4,197,108, which is hereby incorporated by reference, and comprises a lower shaping mold 32 and an upper vacuum shaping mold 34. The latter is composed of metal covered with a refractory material such as fiber glass 36 as is well known in the art. The former comprises an upper surface 38 conforming in elevation shaped to the shape desired for a glass sheet to be bent. The upper surface 38 is interrupted by intermittent transversely extending grooves 40 which provide clearance for raising and lowering the lower shaping mold 32 between a recessed position below run-in conveyor rolls 42, and an upper position above the level of said conveyor rolls. The lower shaping mold 32 is fixed to a lower mold support (not shown) and readily detachable therefrom to substitute a mold 32 for a different production pattern.

The upper surfaces 38 of the lower shaping mold 32 is preferably smoothly surfaced to avoid imparting any irregularity in the supported glass sheet surface, is composed of a material that does not react with glass, is easily shaped to the smoothly surfaced contour desired and has good durability despite intermittent contact with hot glass that causes rapid cyclical temperature variations over an extended period. Raising and lowering means preferably in the form of a piston (not shown) raises and lowers lower shaping mold 32.

The upper vacuum mold 34 has an upper mounting plate 46 and apertured lower wall 48. The lower wall 48 is shaped to be complementary to the shaping surface mold 32. The upper vacuum mold 34 communicates with a source of vacuum (not shown) through an evacuation pipe 50 and a suitable valve (not shown). The upper vacuum mold 34 is suitably connected through upper vertical guide rods 52 to an upper supporting frame (not shown) and movable relative thereto by an upper vertical piston 54. The evacuation pipe 50 may be connected through a suitable valve arrangement to a source of pressurized air (not shown) and the valves for the vacuum line and for the pressure line may be synchronized according to a predetermined time cycle in a manner well known in the art.

As shown in FIG. 1, the tempering station 22 which is the subject of the present invention includes top quench assembly 56 and a bottom quench assembly 58. Shaped glass G sheet exits the shaping station 22 and is conveyed into the tempering station 24 as will be discussed later. The transverse profile of assemblies 56 and 58 ganerally parallels the transverse curvature of the shaped glass sheet.

The construction of each quench assembly is similar. The following discussion relates specifically to the bottom quench assembly 58 but it is understood that it is equally applicable to the top quench assembly 56.

Figure 2:
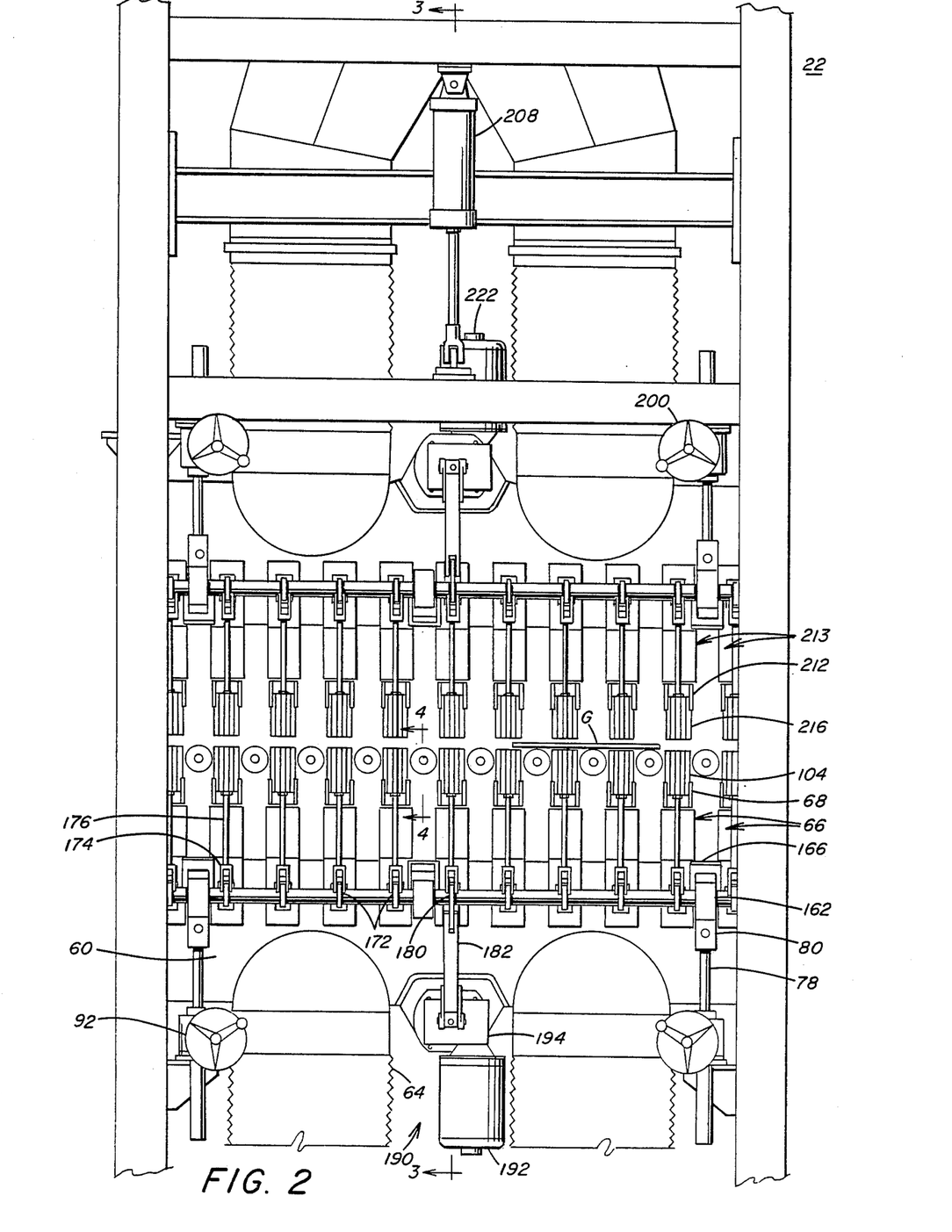
FIG. 2 is an enlarged side view of the quench arrangement of the present invention.
Figure 3:
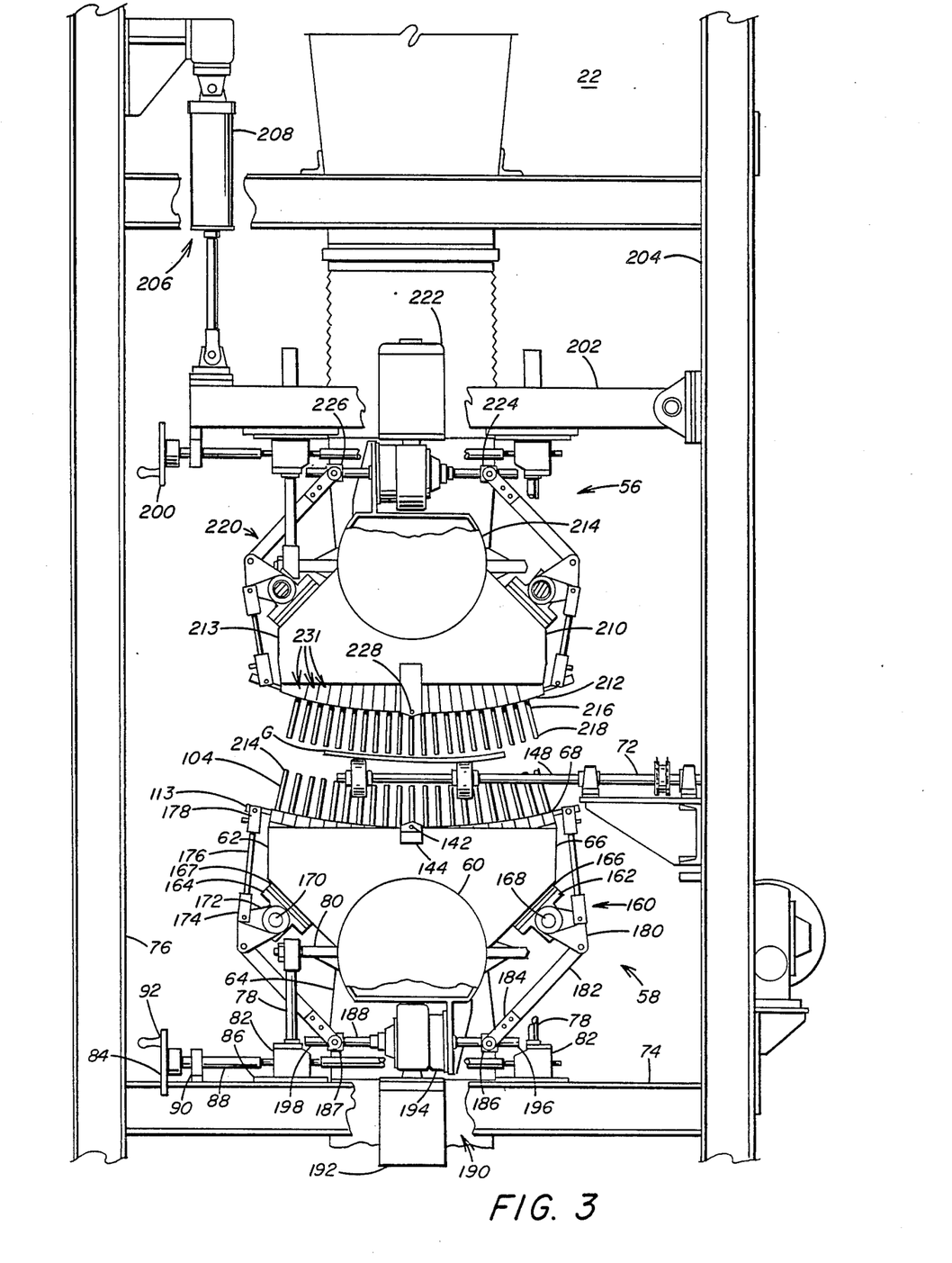
FIG. 3 is a view taken through line 3—3 of FIG. 2 showing a cross-section of the quench arrangement of the present invention.

With continued reference to FIGS. 2 and 3, bottom quench assembly 58 includes a bottom plenum 60 with a plurality of subassemblies 62. Duct 64 supplies cooling fluid, preferably air, to the bottom plenum 60 which is thereafter directed at the glass sheets by the subassemblies 62. The flexible subassemblies 62 which include a nozzle box 66 and flexible nozzle assembly 68 are positioned in space relationship along the bottom plenum 60 with movable conveyor rolls 70 (shown in FIG. 1 only) and stationary conveyor rolls 72 spaced therebetween.

The entire bottom quench assembly 58 is mounted on support beams 74 of frame 76 and can be moved vertically for proper alignment. Although not limiting in the invention, the bottom plenum 60 of the bottom quench assembly 58 is mounted on posts 78 through support bars 80. The posts 78 are mounted on lifting blocks 82 of a jacking device 84, secured to plates 86, and positioned on support beam 74 of frame 76. The jacking device 84 includes a shaft 88 threadedly engaged through each block 82. Shaft 88 passes through bearing support 90 and connects to a handwheel 92. To vertically adjust the bottom quench assembly 58, shaft 88 is rotated by handwheel 92 which causes lifting blocks 82 to raise or lower posts 78 and the supported quench assembly 58. It is understood that the jacking device 84 could be linked to a drive assembly (not shown) to allow for automatic vertical adjustment of the bottom quench assembly 58.

Figure 4:
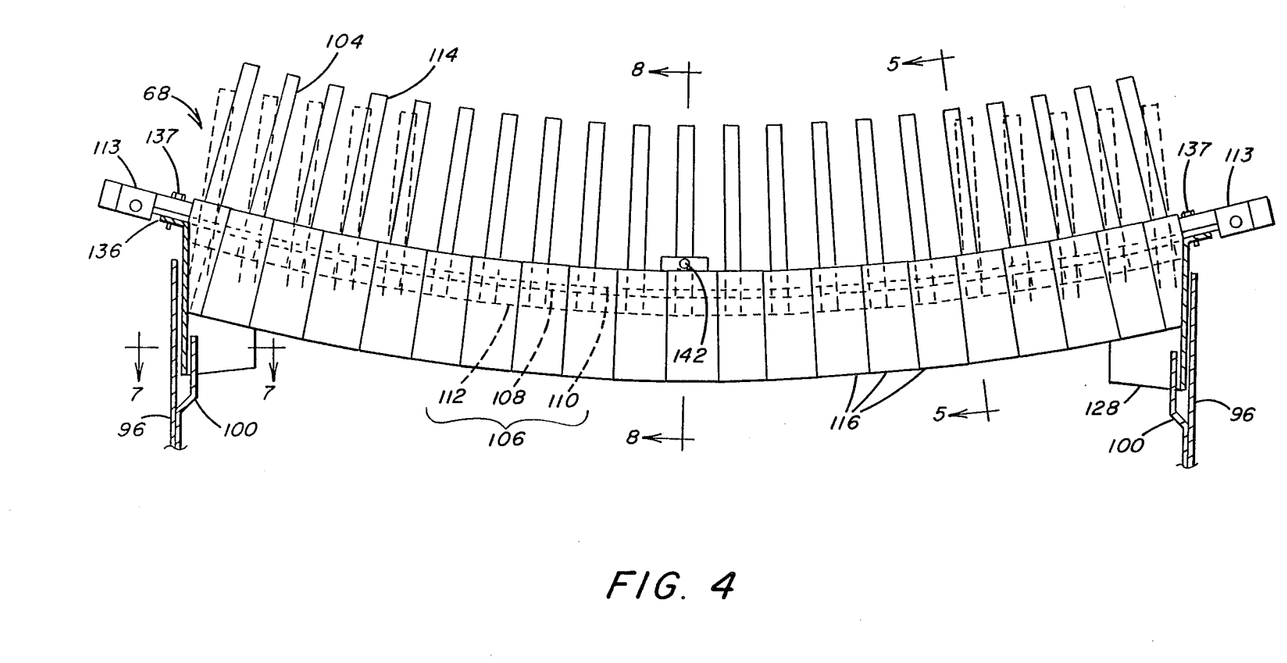
FIG. 4 is a view taken through line 4—4 of FIG. 2 showing the overlapping covers, with portions removed for clarity.
Figure 5:
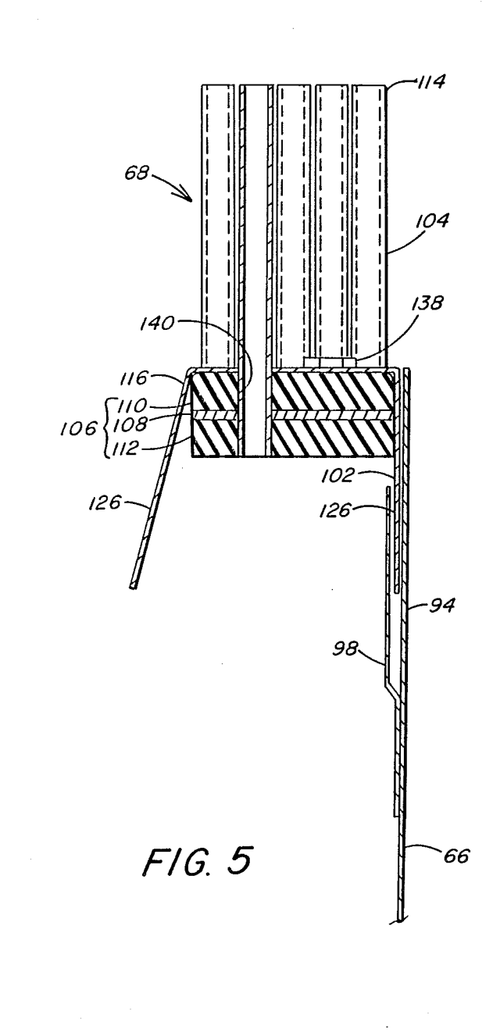
FIG. 5 is a view taken through line 5—5 of FIG. 4.
Figure 6:
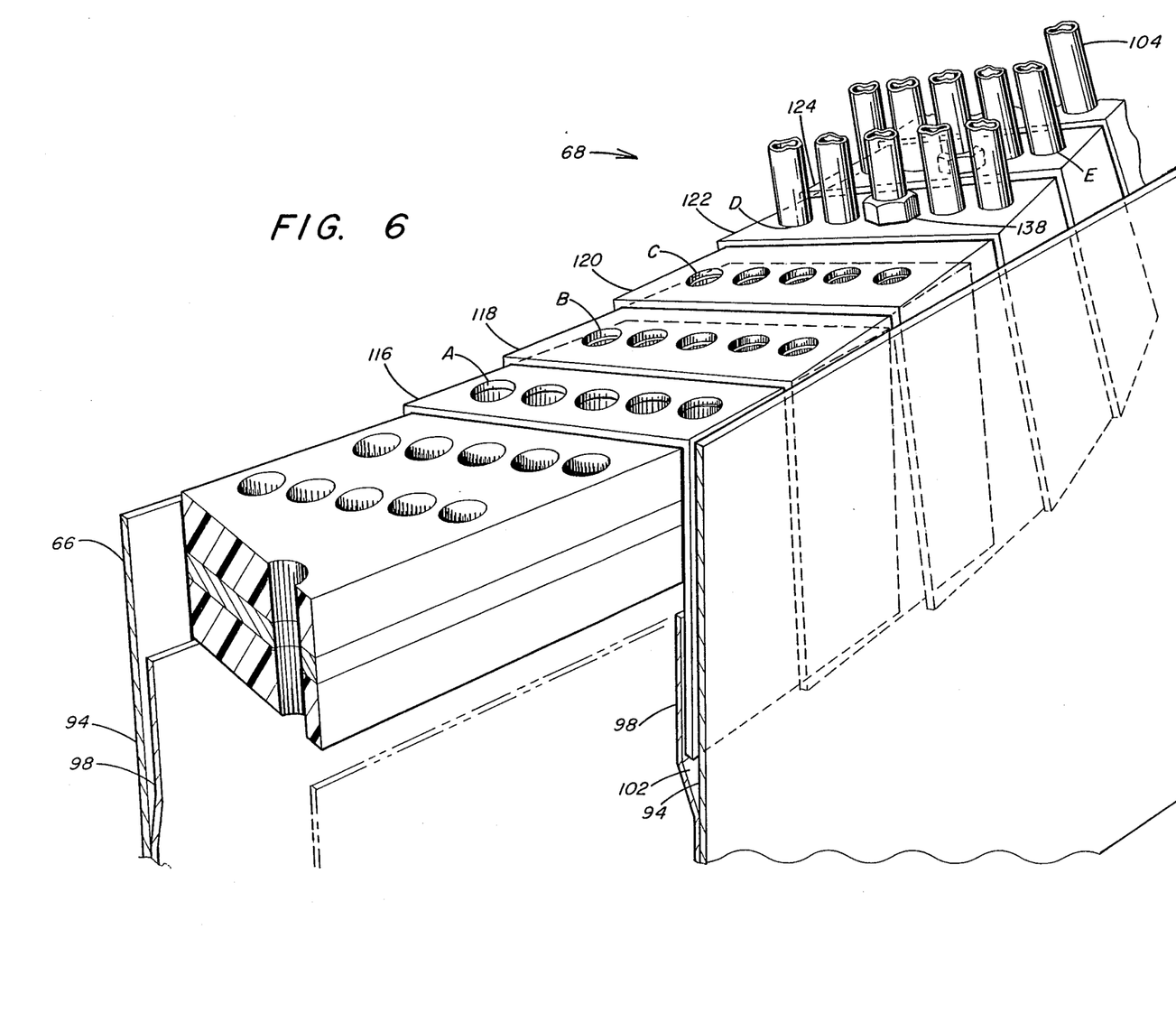
FIG. 6 is an enlarged isometric view of the overlapping covers.

Referring to FIGS. 4, 5, and 6, the nozzle box 66 includes side walls 94 and end walls 96 as well as interior side walls 98 and end walls 100. The interior walls 98 and 100 are spaced from corresponding side walls 94 and end walls 96 so as to leave a pocket 102 therebetween around the inside perimeter of the nozzle box 66, to be utilized in sealing the subassembly 62, as will be discussed later. The lower end of the nozzle box 66 is open for connection to the bottom plenum 60 and the upper end is open to receive a flexible nozzle assembly 68. As shown in FIGS. 4 and 5, the flexible nozzle assembly 68 includes a plurality of nozzles 104 projecting through a composite layer 106 comprised of a steel band 108 sandwiched between two pieces of a flexible, formable material 110 and 112 such as rubber or urethane. End blocks 113 are connected to the ends of the composite layer 106. The steel band 108 positions the nozzles 104 which are press fit therethrough, while the layers 110 and 112 provide additional support and rigidity for the extending portions of the nozzles 104. The head portions 114 of the nozzles 104 form a quenching surface that is generally uniformly spaced from the glass sheet and generally parallels the transverse curvature of the glass sheet to be quenched. Although not limiting to the present invention, the nozzles 104 extend generally normal from the flexible nozzle assembly 68. If desired, the spacing between the head portions 114 of the nozzles 104 and the glass sheet can be irregular such that there is a greater density at the center of the glass sheet where air escape is most difficult.

With continued reference to FIG. 6, nozzle assembly 68 further includes a series of overlapping covers 116 that seal the nozzle box 66 along side walls 94. Although not limited in the present invention, the covers 116 are metal, preferably 20 Ga. stainless steel, and are designed to be inserted over at least two rows of nozzles 104 with each successive cover fitting over at least one common row of nozzles 104. As shown in FIG. 6, covers 118, 120, 122, and 124, fit over nozzle rows A and B; B and C; C and D; D and E, respectively. It should be obvious that covers 116 could cover more than two rows of nozzles as long as there remains at least one set of nozzles that remains common between adjacent covers. For example, an overlapping cover could be used to cover nozzle rows A, B, and C while the next adjacent cover would fit over nozzle rows B, C, and D, or nozzle rows C, D, and E. The covers 116 are bent in a wide U-shape as shown in the left half of FIG. 5. Vertical leg portions 126 of each cover 116 slide within the pocket 102 formed between inner side wall 98 and outer side wall 94 as shown in the right half of FIG. 5. When inserted into pocket 102, the vertical leg portions 126 bias outwardly against outer side walls 94 to aid in sealing the nozzle box 66.

Figure 7:
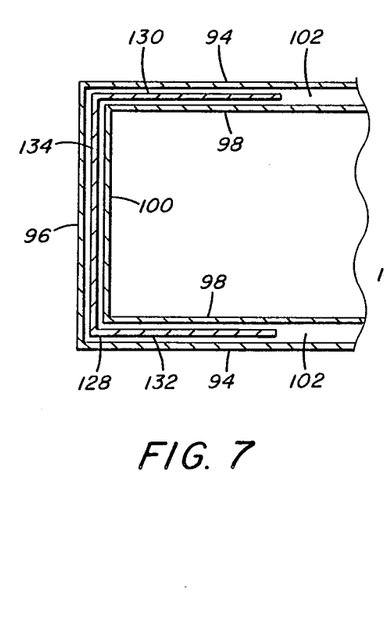
FIG. 7 is a view taken through line 7—7 of FIG. 4

As shown in FIG. 7, end seal 128 is shaped to be slidably received into pocket 102 of the nozzle box 68. Portions 130 and 132 slide within pocket 102 between side walls 94 and 98, while portion 134 slides within pocket 102 between end walls 96 and 100. Referring to FIG. 4, flap 136 extends from an upper portion of the end seal and is connected to steel band 108 in any convenient fashion, for example, by bolts 137.

With reference to FIGS. 5 and 6, a retaining ring 138 is positioned at the base of one of the nozzles in the set of nozzle 104 that are associated with a cover 116 to hold the cover 116 firmly between the ring 138 and the underlying urethane or rubber layer 110 of the composite layer 106. The holes 140 in the cover 116 are preferably slidably slotted to allow the nozzles 104 to move relative to the cover 116 when the nozzle assembly 68 is flexed.

Figure 8:
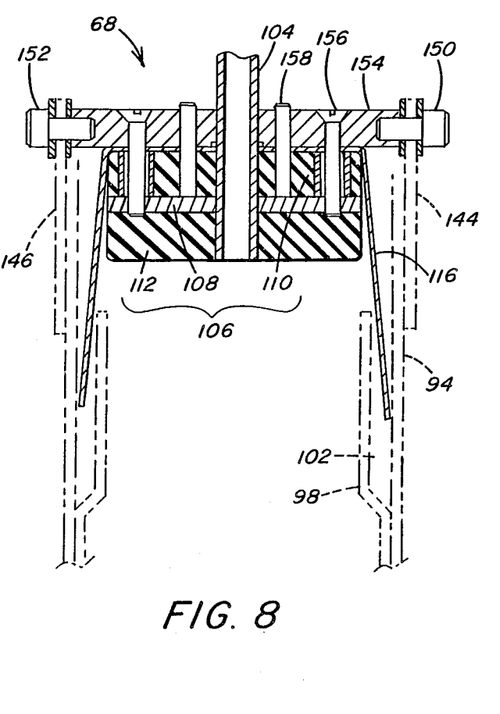
FIG. 8 is a view through line 8—8 of FIG. 4 showing the connection between the nozzle assembly and the pivot bar.

Although not limited in this invention, in the preferred embodiment, all the nozzles 104 are of the same length so that as the nozzle assembly 68 is flexed, the head portions 114 of the nozzles 104 form a smooth arcuate configuration. Referring to FIGS. 3, 4, and 8, the nozzle assembly 68 is preferably pivotally fixed to the nozzle box 66 at a single point 142, preferably but not limited to the midpoint, by retainer plates 144 and 146 thus establishing a fixed distance between the center of the flexible nozzle assembly 68 and shaft 148 of the conveying rolls 70 and 72. As shown in FIG. 8, pins 150 and 152 are attached to opposite ends of block 154 which is secured to steel band 108 by screws 156. Pins 150 and 152 are inserted through holes in plates 144 and 146 to fix the midpoint of the flexible nozzle assembly 68. Due to variations in the thickness of the layer 110, set screws 158 can be inserted through block 154 to band 108 to limit the compression of layer so as to fix the distance between block 154 and steel band 108 as well as the corresponding position of pins 150 and 152. It is understood that a fixed point other than the midpoint, or several fixed points can be used in the subassembly 62.

This arrangement effectively seals the flexible subassembly 62 so that nozzle assembly 68 can flex within the nozzle box 66 while maintaining a seal around the perimeter of nozzle box 66.

The nozzle assembly 68 is flexed by linkage assembly 160 as shown in FIGS. 2 and 3. Bearing blocks 162 and 164 are mounted on the plates 166 and 167, respectively, which span between selected adjacent nozzle boxes 66. Pivot bars 168 and 170 extend through the bearing blocks 162 and 164, respectively. A plurality of lever members 172 each aligned with a nozzle box 66 are fixed to the pivot bars 168 and 170. A clevis member 174 straddles each lever 172 and is pinned thereto to form a loose pivotal connection. Rod 176 extends from clevis 174 and connects with clevis 178 which is pinned to the end block 113 at the ends of the composite layer 106 of the flexible nozzle assembly 68.

Pivot bars 168 and 170 each include a main pivot lever 180 securely fixed to the bars 168 and 170. A link 182 is pinned to each main pivot lever 180 at one end and fixed to bracket 184 at its other end. Bracket 184 is pinned to either of the blocks 186 or 187, each of which is threadedly engaged on shaft 188 of drive 190. It should be obvious to one skilled in the art that if the main pivot lever 180 is aligned with a subassembly 62, lever member 172 and main pivot lever 180 could be combined into a single member, fixed to one of the pivot bars 168 or 170 and pinned to both clevis member 174 and link 182.

Although not limited in the present invention, the drive 190 includes a motor 192 and a reducer 194. When changing the curved configuration of the nozzle assembly 68, blocks 186 and 187 are moved by drive 190 in opposite directions, i.e. either towards or away from each other. This can be done in a number of ways well known in the art. In the preferred embodiment, as shown in FIG. 3, reducer 194 is preferably a double shaft reducer with blocks 186 and 187 engaging shaft portions 196 and 198 respectively which extend from single main shaft 188. The shaft portion 196 threadedly engages block 186 in a direction opposite from the threaded engagement of block 187 by shaft portion 198. It should be appreciated that the nozzle assembly 68 can be flexed using a manual arrangement wherein the shaft 188 could be rotated by hand rather than by the drive 190.

In operation, the quench surface formed by the nozzles 104 of the subassembly 62 is adjusted so as to generally parallel the transverse curvature of a shaped glass sheet adjacent thereto. Nozzle assembly 68 is flexed by drive 190 through the linkage assembly 160. To decrease the radius of curvature of the nozzle assembly 68, i.e. increase the curvature of the quench surface motor 192 and reducer 194 rotate shaft 188 to simultaneously move blocks 186 and 187 away from each other as shown in FIG. 3. As the blocks 186 and 187 move outwardly, links 182 which are pinned to main pivot levers 180 force levers 180 to rotate and turn pivot bars 168 and 170 in a clockwise and counterclockwise direction, respectively. As pivot bars 168 and 170 rotate, lever members 172 rotate in the same direction as the corresponding pivot bar. Rods 176 which are pinned at one end to the lever 172 and at the other end to the end blocks 113 of the nozzle assembly 68, force the ends of the nozzle assembly 68 upward. The nozzle assembly 68 is fixed at its midpoint 148 by retainer plates 144 and 146 and pins 150 and 152 so that the entire nozzle assembly 68 does not simply move upward. As a result, nozzle assembly 68 flexes about midpoint 148 and assumes a sharper radius of curvature.

To increase the radius of curvature of nozzle assembly 68, i.e. flatten the quench surface, the previously described operation operates in reverse. Motor 192 and reducer 194 rotate shaft 188 to move blocks 186 and 187 towards each other as shown in FIG. 3. As a result, links 182 pull down on main pivot levers 180, rotating pivot bars 168 and 170 counterclockwise and clockwise, respectively. Rotation of bars 168 and 170 rotates lever members 172 which, through clevis 174, rod 176, and clevis 178 pull end block 113 of the nozzle assembly 68 downward, thus increasing its radius of curvature.

As long as the blocks 186 and 187 move toward or away from the reducer 194 equal amounts, the end blocks 178 of the nozzle assembly 68 will move up or down an equal amount. If required, the drive 190 can be modified to move one end block a different vertical distance than the opposing end block of the nozzle assembly 68. This could be done in any of a variety of ways. For example, the threaded portion of shaft portions 196 and 198 can have different thread pitches so that as main shaft 188 rotates, the threadedly engaged blocks 186 and 187 move toward or away from the reducer 194 at different amounts. As an alternative each block 186 and 187 can be moved by separate drive assemblies so that each end block can be moved to the precise elevation required by the shaped glass sheet curvature.

It should be appreciated that the construction and operation of the top quenched assembly 56 is substantially similar to the bottom quench assembly 58.

Referring again to FIGS. 2 and 3, the top quench assembly 56 is mounted from jacking device 200 below a lifting support beam 202. Support beam 202 is pinned at one end at column 204 of frame 76 and connected to a lifting unit 206 at its opposite end. Lifting unit 206 includes a rod and piston arrangement 208 pinned to the frame 76 for lifting the top quench assembly 56 so as to provide addition access between quench assemblies 56 and 58.

Subassemblies 210 with flexible nozzle assemblies 212 slidably received within nozzle boxes 213 are spaced along upper plenum 214, The nozzle assemblies 212 include nozzles 216 with head portions 218 that form an upper quench surface that generally parallels the transverse curvature of the glass sheet to be quenched. The nozzle assemblies 212 are flexed by a linkage arrangement 220 and drive arrangement 222 similar to linkage assembly 160 and drive 190 of the bottom quench assembly 58. The flexing operation of the top quench assembly 56 is similar to that of the bottom quench assembly 58 except that as blocks 224 and 226, which ganerally correspond to blocks 186 and 187 of the bottom quench assembly 58, move away from each other, the top quench surface of the top quench assembly 56 assumes a greater radius of curvature, i.e., become flatter, as compared to the bottom quench assembly 58 whose quench surface decreases in radius of curvature. Similarly as blocks 224 and 226 move toward each other the top quench surface decreases its radius of curvature, i.e., assumes a more curved configuration.

Nozzle assemblies 68 and 212 of quench assemblies 58 and 56 are oriented in opposing relation to each other so as to allow the nozzles 104 and 216 to direct cooling air at the opposing major surfaces of the shaped glass sheet G. The nozzles 104 and 216 are spaced apart to allow glass sheet G and, if the bending operation requires, the sheet transfer means to move therebetween.

Since the nozzles 104 and 216 extend generally in a normal direction from the flexible nozzle assemblies 68 and 212, respectively, and the quench surface formed by the head portions 114 and 218 of the nozzles 104 and 216, respectively, are adjusted to generally parallel the transverse curvature of the shaped glass sheet positioned therebetween, it follows that the nozzles 104 and 216 are also generally normal to the glass sheet. Furthermore, the construction of the quench assemblies 56 and 58 provide that the nozzles 104 and 216 maintain the normal alignment even when they are flexed to conform to a different glass sheet curvature. The normal alignment provides certain advantages when tempering shaped glass sheets. Since each nozzle is perpendicular to the major surfaces of the glass sheet the impact of the cooling fluid on the glass sheet surfaces is more uniform and there is a more even escape of the fluid, i.e. there is no flow of cooling fluid across the major surface that would reduce the uniformity of the tempering operation.

It should be noted that as compared to other contoured quench surfaces which have nozzles of varying lengths, the flexing of the quench assemblies 56 and 58 does not change the lengths of the nozzles. As a result the loss of fluid pressure over the length of the nozzles will be uniform so that the fluid pressure will remain generally uniform across the glass sheet surface.

Referring to FIG. 3, it can be seen that in the preferred embodiment, the fixed midpoint 142 of bottom quench assembly 58 is closer to nozzle box 66 than corresponding fixed midpoint 228 is to nozzle box 213 of top quench assembly 56. This is due to the operation of each assembly. As the bottom quench assembly 58 changes from a flat to a curved contour, portions of the flexible nozzle assembly 68 begin to move out of the nozzle box 66 with its end portions moving further than its interior portions due to the movement restrictions of the fixed midpoint 142. In comparison, as the top quench assembly 56 changes from a flat to a curved contour, portions of the flexible nozzle assembly 212 begin to move into nozzle box 213. Again, the end portions move farther than the interior portions due to fixed midpoint 228. As a result, when the required quench surface is flat, the covers 116 of bottom quench assembly 58 are recessed their maximum depth within the nozzle box 66, while covers 230 of top quench assembly 56 are extended the maximum distance out from the nozzle box 213. When the quench surface is at its sharpest required curvature, covers 116 extend their maximum distance out from nozzle box 66, while covers 230 are recessed their maximum depth within nozzle box 213.

It should also be noted that radius of curvature of the quench surfaces for the top quench assembly 56 and bottom quench assembly 58 are not necessarily equal. As stated earlier, the quench surface of the assembly 56 generally parallels the inwardly curved major surface of glass sheet G while the quench surface of the assembly 58 generally parallels the outwardly curved major surface. Since the quench surfaces and the glass sheet surfaces generally parallel each other there is a common center of curvature, and the farther a surface is from the center of curvature, the greater is the radius of curvature. As a result, and with reference to FIG. 3, it can be seen that the quench surface on top quench assembly 56 is bent sharper, i.e., has a smaller radius of curvature, than the quench surface on bottom quench assembly 58.

The sheet transfer means 26 at the tempering station 22 as shown in FIG. 1 is similar to that disclosed in U.S. Pat. No. 4,197,108 and includes the vertically movable conveyor rolls 70, which in the preferred embodiment is a set of doughnut rolls 232 each of which includes a pair of relatively large diameter roll members 234 mounted on the central portion of shafts 236 of frame 238 and driven from a gear box and a motor (not shown). Elevator means 240 in the form of one or more pistons each with a piston rod 242 is rigidly supported on the frame. Vertical guides (not shown) control movement of the frame 238 in such a manner that when piston rods 242 are extended, the set of doughnut rolls 232 is lifted in unison in a vertical direction into positions where their common upper tangential plane lies in a horizontal plane above the uppermost portion of the shaping surfaces of a ring-like member 244 to transfer a glass sheet therefrom.

The member 244 comprises a rail that extends in the form of a ring-like structure disposed edgewise with its width forming the height of the rail. The frame-like member 244 is shaped in outline similar to the outline shape of a supported glass sheet and in elevation similar to the curvature of the supported glass sheet. Connectors 246 are attached at their inner ends to the laterally outer surface of the rail at spaced points therealong and at their outer ends to a reinforcing frame 248.

The ring-like member 244 and the reinforcing frame 248, both of which include open portions at their downstream ends, form a carriage 250 which is connected to side rail 252 through connecting members 254. A drive means (not shown) slides in carriage assembly 250 between an upstream position at shaping station 24 and a downstream position in alignment with sheet transfer means 26.

The doughnut rolls 232 of the shaped glass sheet transfer means 26 are arranged in spaced, parallel rows. At their upper positions, the vertically movable rolls 232 have an upper common tangent in the same horizontal plane as the upper common tangent of additional doughnut rolls 256 of conveyor rolls 72 which are driven by a motor (not shown) separate from the roll 232 drive. At their lower positions, rolls 232 are located below the path taken by ring-like member 244 and its supporting frame 248.

In operation, the glass sheet G which is formed in shaping station 24 and held in vacuum engagement against upper vacuum mold 34, is deposited on and supported by the ring-like member 244 which in turn transfers the glass sheet G to the tempering station 22. The doughnut rolls 232 are raised in unison to lift the glass sheet G off the ring-like member 244 while rotating in unison in a direction that propels the glass sheet G onto doughnut rolls 256 in a downstream direction, through tempering station 22. When the glass sheet is removed, the rolls 232 are lowered and the ring-like member 244 returns in an upstream direction towards the shaping station 24.

It should be understood that the specific embodiment of this invention disclosed and described is presented for the purpose of examination and illustration and is not intended to limit the invention, the scope of which is defined by the following claims.

I claim:

1. An apparatus for cooling a shaped glass sheet comprising:

a nozzle box;

a plurality of overlapping covers each having center portions overlying a flexible support and opposing leg portions extending along walls of said nozzle box such that said flexible support and covers are slidably engaged with said nozzle box to seal said box;

a plurality of nozzles extending from said flexible support, through openings in said center portions of said covers towards a major surface of said glass sheet wherein nozzle portions adjacent said major surface form a quench surface; and means to adjustably bend said flexible support so as to modify the curvature of said quench surface formed by said nozzles.

2. The apparatus as in claim 1 wherein adjacent overlapping covers each include at least one aligned opening through which a common nozzle extends from said flexible support through each of said adjacent covers.

3. The apparatus as in claim 2 wherein said nozzle box includes a circumferential interior wall spaced from its exterior walls to form a pocket therebetween wherein said opposing leg portions extend into said pocket.

4. The apparatus as in claim 3 wherein said apparatus includes a plurality of nozzle boxes, each of said boxes connected to a common cooling fluid plenum to direct fluid from a fluid source through said plenum, nozzle boxes and nozzles to quench said sheet.

5. The apparatus as in claim 4 wherein said nozzles are generally normal to said major surface of said glass sheet.

6. The apparatus as in claim 1 wherein said flexing means includes means to maintain a fixed portion of said flexible support at a predetermined position relative to said box and means to move a first portion of said flexible support relative to said fixed portion so as to change the configuration of said quench surface.

7. The apparatus as in claim 6 wherein said flexing means further includes means to move a second portion of said flexible nozzle support relative to said fixed portion.

8. The apparatus as in claim 7 wherein said first and second portion moving means include a drive to simultaneously move said first and second portions relative to said fixed portion.

9. The apparatus as in claim 7 wherein said fixed portion is the midpoint of said flexible support and said first and second portions are opposing end portions of said flexible support.

10. The apparatus as in claim 9 wherein said first portion moving means includes a first drive to flex said first portion and said second portion moving means includes a second drive to flex said second portion.

11. The apparatus as in claim 10 wherein said first portion moving means includes:

individual linkage assemblies each pivotally connected at one end to a first end of each of said flexible supports;

a pivot bar rotatably mounted to and generally extending along said nozzle boxes;

a yoke assembly pivotally connected at one end to said first drive;

a series of levers spaced along and fixed to said pivot bar, such that a second end of each of said linkage assemblies is pivotally connected to a corresponding one of said levers; and a main pivot lever fixed to said pivot bar and positioned such that a second end of said yoke assembly is pivotably connected to said main pivot lever, wherein as said first drive acts on said yoke assembly, said yoke assembly rotates said pivot bar through said main pivot lever which in turn rotates said set of levers and through said linkage assemblies simultaneously moves said first portions of each of said flexible supports.

12. The apparatus as in claim 11 wherein said linkage assemblies, pivot bar, yoke assembly, levers and main pivot lever are first linkage assemblies, first pivot bar, first yoke assembly, first lever, and first main pivot lever and further wherein said second portion moving means includes:

second individual linkage assemblies each pivotally connected at one end to a second end of each of said flexible supports;

a second pivot bar rotatably mounted to and generally extending along said nozzle boxes a second yoke assembly pivotally connected at one end to said second drive;

a second series of levers spaced along and fixed to said second pivot bar, such that a second end of each of said second linkage assemblies is pivotally connected to a corresponding one of said second levers; and a second main pivot lever fixed to said second pivot bar and positioned such that a second end of said second yoke assembly is pivotably connected to said second main pivot lever, wherein a said second drive acts on said second yoke assembly, said second yoke assembly rotates said second pivot bar through said second main pivot lever which in turn rotates said second set of levers through said second linkage assemblies and simultaneously moves said second portions of each of said flexible supports.

13. The apparatus as in claim 12 wherein said first drive and said second drive are a single drive such that said single drive simultaneously acts on said first and second yoke assemblies to rotate said first and second pivot bars and move said first and second portions of each of said flexible supports.

14. The apparatus as in claim 13 wherein said plurality of nozzle boxes is a first plurality of nozzle boxes and said apparatus further includes a second plurality of nozzle boxes in facing relationship to said first plurality of nozzle boxes to direct respective streams of tempering fluid against opposing major surfaces of a glass sheet positioned therebetween.

15. The apparatus as in claim 14 further including means to support said shaped glass sheet between said first and second plurality of nozzle boxes.

16. The apparatus as in claim 15 wherein said cooling of said glass sheet imparts at least a partial temper in said glass sheet and further including means to heat said glass sheet to a heat softening temperature and means to shape said glass sheet prior to tempering.

17. The apparatus as in claim 16 wherein said sheet is generally horizontal during quenching.

18. The apparatus as in claim 17 further including means to adjust the lateral position of said tempering apparatus.

19. The apparatus as in claim 10 wherein adjacent overlapping covers each include at least one aligned opening through which a common nozzle extends from said flexible support through each of said adjacent covers.

20. The apparatus as in claim 19 wherein said nozzle box includes a circumferential interior wall spaced from its exterior walls to form a pocket therebetween wherein said opposing leg portions extend into said pocket.

21. The apparatus as in claim 20 wherein said apparatus includes a plurality of nozzle boxes, each of said boxes connected to a common cooling fluid plenum to direct fluid from a fluid source through said plenum, nozzle boxes and nozzles to quench said sheet.

22. The apparatus as in claim 21 wherein said nozzles are generally normal to said major surface of said glass sheet.

23. The apparatus as in claim 18 wherein adjacent overlapping covers each include at least one aligned opening through which a common nozzle extends from said flexible support through each of said adjacent covers.

24. The apparatus as in claim 23 wherein said nozzle box includes a circumferential interior wall spaced from its exterior walls to form a pocket therebetween wherein said opposing leg portions extend into said pocket.

25. The apparatus as in claim 24 wherein said apparatus includes a plurality of nozzle boxes, each of said boxes connected to a common cooling fluid plenum to direct fluid from a fluid source through said plenum, nozzle boxes and nozzles to quench said sheet.

26. The apparatus as in claim 25 wherein said nozzles are generally normal to said major surface of said glass sheet.

* * * * *

UNITED STATES PATENT AND TRADEMARK OFFICE
CERTIFICATE OF CORRECTION

PATENT NO. : 4,711,655
DATED : December 8, 1987
INVENTOR(S) : Stephen J. Schultz It is certified that error appears in the above-identified patent and that said Letters Patent is hereby corrected as shown below:

Claim 7 (line 3), delete "nozzle".

Signed and Sealed this

Twenty-fourth Day of May, 1988

Attest:

DONALD J. QUIGG

*Attesting Officer*        *Commissioner of Patents and Trademarks*